Oct. 15, 1957   U. D. WHITEHEAD ET AL   2,809,816
MORTAR MIXER
Filed July 26, 1954   3 Sheets-Sheet 1

Ulysses D. Whitehead
Samuel B. Oren
INVENTORS

Oct. 15, 1957 U. D. WHITEHEAD ET AL 2,809,816
MORTAR MIXER
Filed July 26, 1954 3 Sheets-Sheet 2
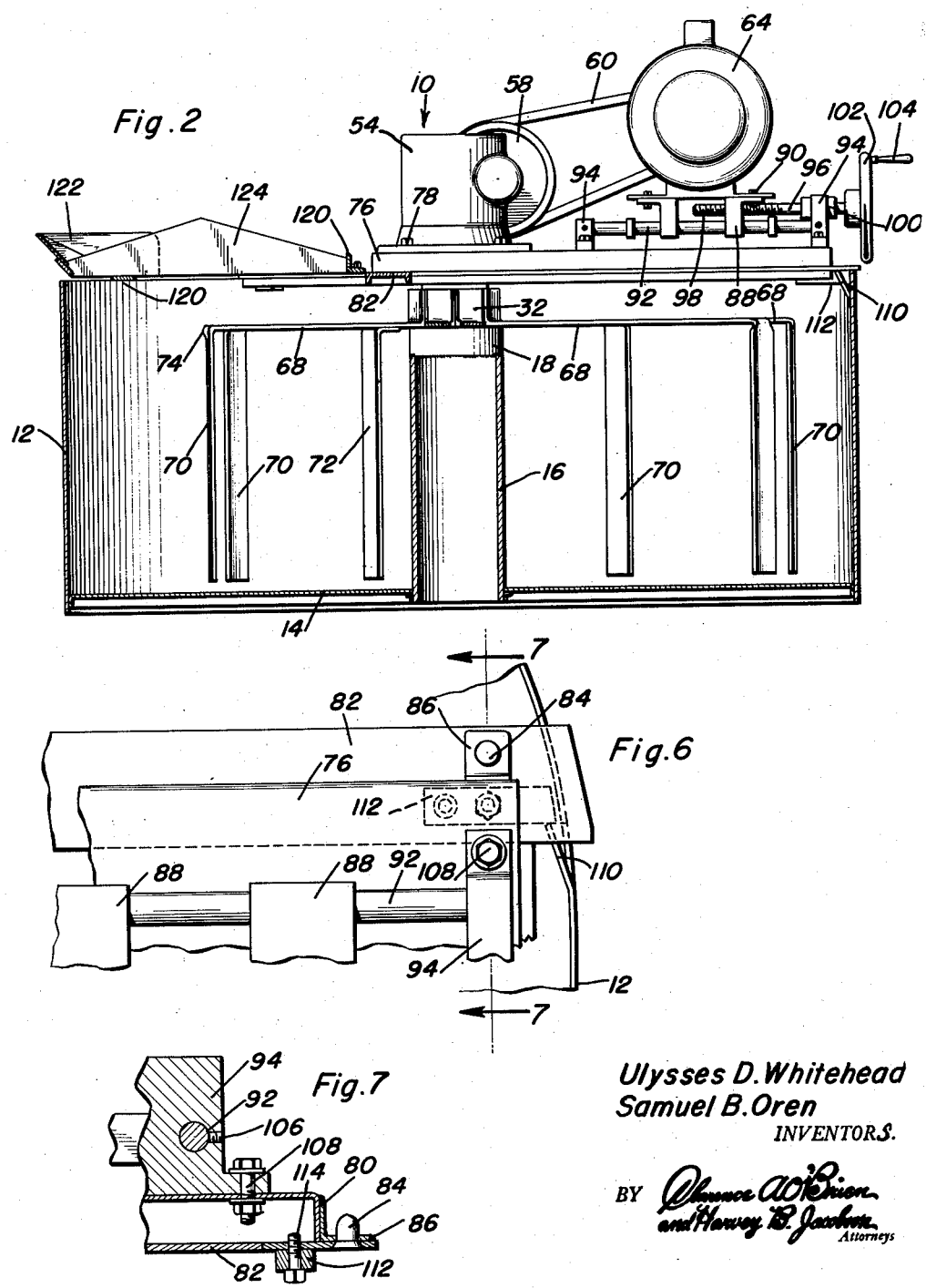
Ulysses D. Whitehead
Samuel B. Oren
INVENTORS.
BY *Attorneys*

Oct. 15, 1957 U. D. WHITEHEAD ET AL 2,809,816
MORTAR MIXER
Filed July 26, 1954 3 Sheets-Sheet 3
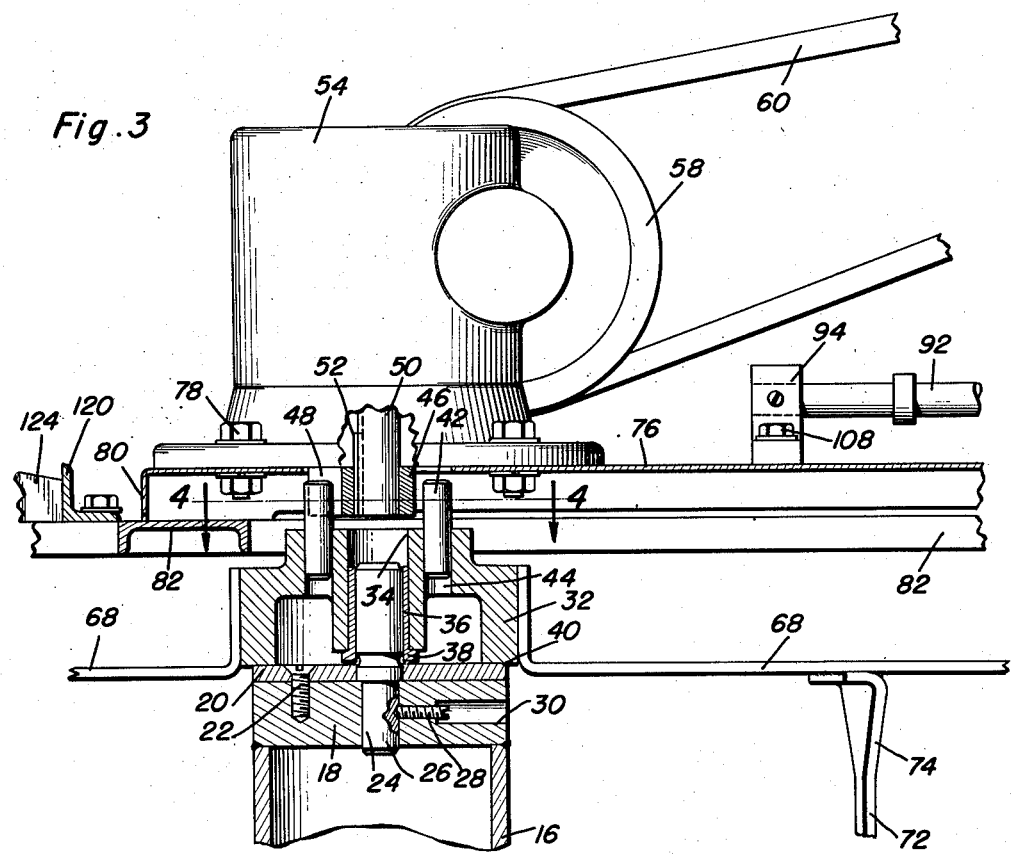
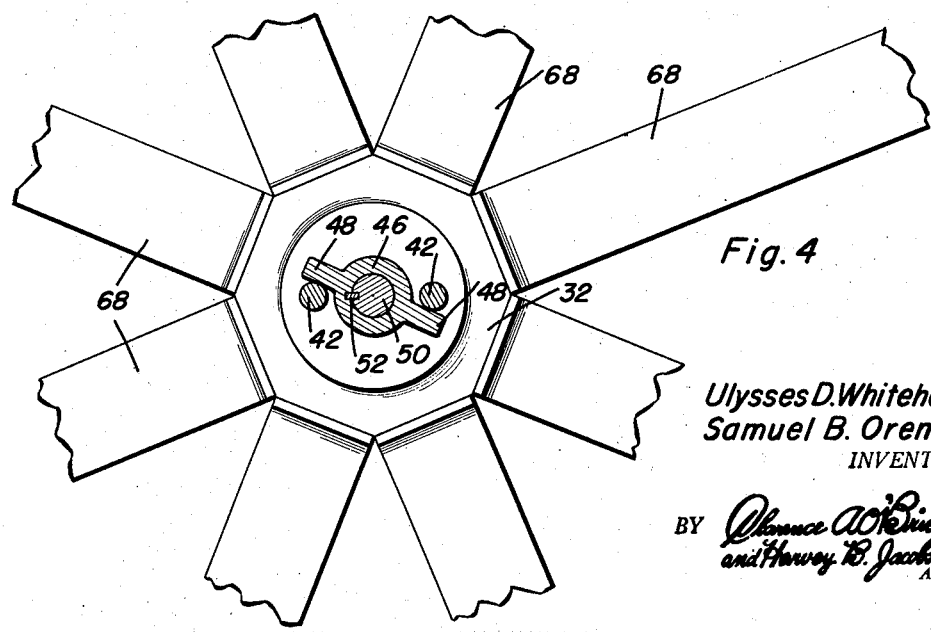
Ulysses D. Whitehead
Samuel B. Oren
INVENTORS

United States Patent Office 2,809,816
Patented Oct. 15, 1957

2,809,816

MORTAR MIXER

Ulysses D. Whitehead, West Alexandria, and Samuel B. Oren, Brookville, Ohio

Application July 26, 1954, Serial No. 445,872

4 Claims. (Cl. 259—178)

This invention relates to a mortar mixer and more specifically provides a device that is removably positioned over a container for thoroughly mixing mortar by the utilization of a plurality of agitating paddles thereby forming a smooth, homogeneous mixture.

An object of this invention is to provide a mortar mixer that is removably positioned on a cylindrical container wherein the mixer may be removed therefrom for mixing the mortar in more than one container for permitting the mixed mortar to be utilized from one container while the mortar is being mixed in a second container thereby forming an efficient mortar mixing operation wherein a supply of mortar is available at all times.

Another object of this invention is to provide a mortar mixer having a plurality of circumferentially spaced paddles secured to a central rotating member wherein the blades are positioned at various radial distances from the central member thereby thoroughly mixing the material in the container.

Still another object of the present invention is to provide a mortar mixer as set forth in the preceding objects wherein the paddles or blades are set in angular relation to the path of movement of the paddles thereby moving the material in a circular direction and in a radial direction thereby thoroughly mixing the material.

A still further object of the present invention is to provide a mortar mixer that may be utilized in mixing plaster mortar, finishing materials, brick mortar, tile mortar or other materials of similar texture.

Yet another important object of the present invention is to provide a mortar mixer wherein the speed of the mixer may be adjusted wherein the materials in a container may be mixed at various speeds wherein mixtures such as finish coats for plaster that require a smooth creamy texture would be mixed at a faster speed thereby providing a more forceful beating action and forming a smooth texture.

Still another important object of the present invention is to provide a mortar mixer that is removably positioned on an open receptacle wherein the device may be removed for easy cleaning of the mixing blades and also to permit the device to be moved from container to container.

Other objects of the present invention are found in its simplicity of construction, efficiency in use, adaptability to various uses, lightness in construction and relatively inexpensive manufacture and maintenance.

Still another important feature of the present invention is to provide a mortar mixer having a frame positioned on the upper end of a container wherein a support is provided for bags of material to be positioned in the container and an upstanding pointed member is provided for opening the bags of material and the support provides a rest for the bag and also spreads the material evenly about the container thereby facilitating the mixing operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a vertical sectional view taken substantially upon a plane passing through the longitudinal center line of the construction of Fig. 1;

Figure 3 is an enlarged sectional view showing the drive mechanism for transmitting motion to the rotating blade;

Figure 4 is a top plan sectional view taken substantially along section line 4—4 of Figure 3 showing further structural details of the detachable clutch or power transmitting means;

Figure 1:
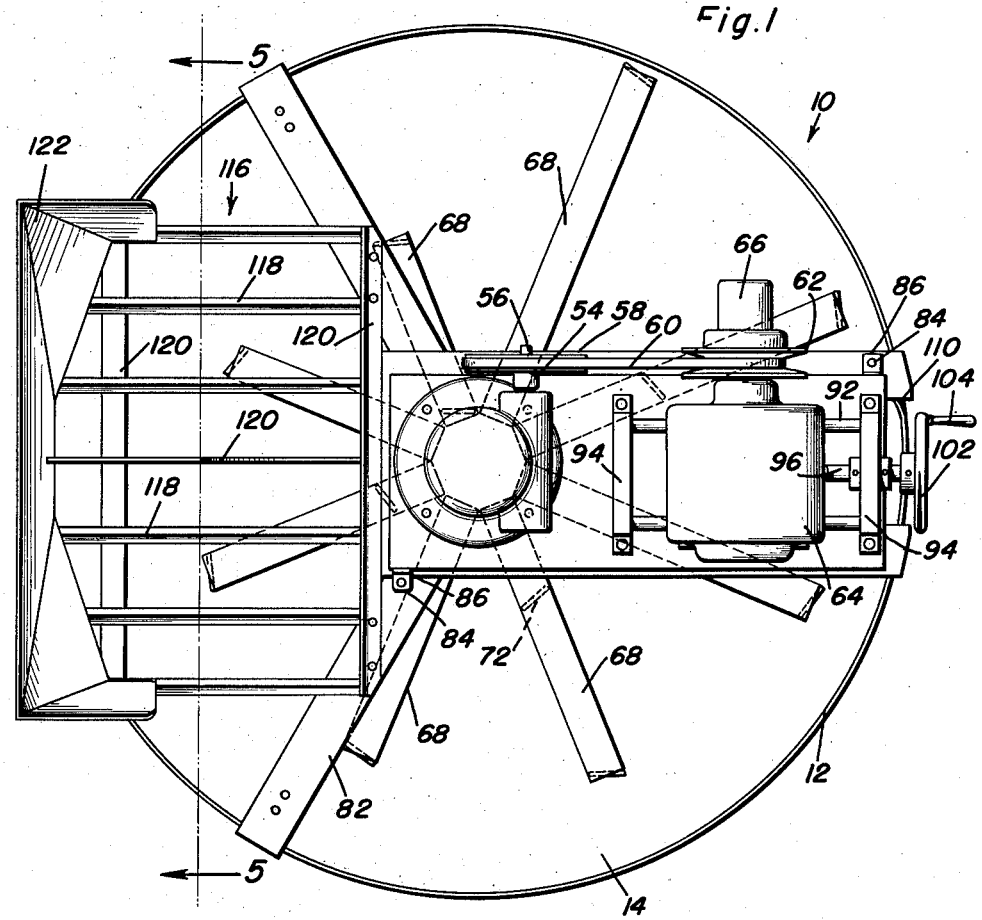
Figure 1 is a top plan view of the mortar mixer of the present invention.
Figure 5:
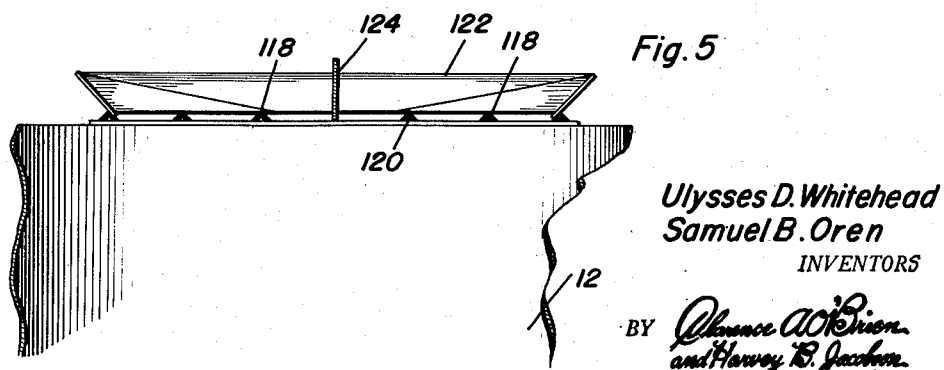
Figure 5 is a transverse, vertical sectional view taken substantially upon a plane passing along section line 5—5 of Figure 1 showing the details of construction of the bag or sack support together with the upstanding member for opening the bag of material.

Figure 6 is a detailed top plan view showing the locating means for positioning the frame on the upper end of the container wherein relative rotation between the frame and the container will be prevented by the struck out lugs; and Figure 7 is a detailed, sectional view taken substantially upon a plane passing along section line 7—7 of Figure 6 showing the structure details of the positioning dowels for positioning the motor base on the frame.

Referring now specifically to the drawings, it will be seen that the numeral 10 generally designates the motar mixer of the present invention wherein the mortar mixer 10 includes a receptacle or container 12 having a bottom wall 14 and a cylindrical side wall together with an open top. It will be understood that the container 12 may be of any suitable size and the mortar mixer 10 is detachably positioned on the open upper end of the cylindrical container 12.

Secured to the bottom 14 is an upstanding tubular member 16 having a closed upper end 18. The closed upper end 18 of the tubular member 16 is provided with a bearing plate 20 secured thereon by countersunk screws 22 and the central portion of the bearing plate 20 and the closed upper end 18 is provided with an aperture 24 for receiving an upwardly extending stub shaft 26 that is secured therein by a set screw 28 that is recessed in a countersunk bore 30 wherein the stub shaft 26 is securely and rigidly attached to the closed upper end 18 of the tubular member 16. It will be seen that the tubular member 16 is welded or secured to the bottom 14 by any suitable manner and forms a permanent part of the container 12.

Journalled on the upper end of the stub shaft 26 is a hub 32 having a central bore 34 wherein the bore 34 is positioned over the upper end of the stub shaft 26 with a sleeve bearing 36 positioned therebetween. The sleeve bearing 36 is provided with an outwardly directed flange 38 at its lower end for engaging the lower end of the hub 32 thereby retaining the bearing sleeve 36 in correct position. The hub 32 rides against the upper surface of the bearing plate 20 substantially as indicated by the numeral 40 wherein the hub 32 is rotatably journalled on the upper end of the tubular member 16. A pair of projecting pins 42 are rigidly secured in bores 44 in the hub 32 thereby providing means for engagement by a driving hub 46 having a pair of laterally and diametrically opposed projections 48 wherein the projections extend outwardly and engage the pins 42 for driving the hub 32 in a rotative manner about the stub shaft 26. The driving hub 46 is secured to a drive shaft 50 by a suitable key 52 and the shaft 50 is a drive shaft from a worm reduction gear unit 54 wherein the input shaft 56 of the worm reduction gear 54 is provided with a V-belt pulley 58 having a V-belt 60 encircling the pulley 58 and a similar pulley 62 in alignment therewith. The pulley 62 is driven by a suitable electric motor 64 and includes a spring housing 66 wherein the sides of the pulley 62 may be moved in relation to each other thereby varying the relative rotational speed between the pulleys 62 and 58 thereby varying the speed of rotation of the hub 32.

Secured to the hub 32 is a plurality of radially projecting arms 68 wherein the present illustration shows eight of the arms 68 forming substantially a complete circle wherein the outer ends of the arms 68 turn downwardly in right angular relation as indicated by the numeral 70. The length of the arms 68 vary thereby spacing the depending portions 70 in radially spaced relation. On the longer arms 68 depending paddles 72 are provided and the paddles 72 are provided with a twisted portion 74 and the outer ends 70 are also provided with a twisted portion 74 thereby changing the angular relation of the paddles 70 and 72 in relation to the path of movement thereof. Due to the radial spacing of the paddles 70 and 72 and the circumferential spacing of the arms 68 having the paddles 70 and 72 mounted thereon, it will be seen that upon rotation of the hub 32, the paddles 70 and 72 will rotate within the container 12 about the center thereof for completely agitating and mixing material therein. Due to the angular offset portion 74 of the paddles 70 and 72, the paddles are positioned in angular relation to the path of movement so that the material will be moved radially and circumferentially in the container and at the same time, the paddles 70 and 72 are slicing their way through the material in order to disintegrate all lumps and thoroughly mix the liquid and dry materials into a smooth, homogeneous mixture.

Referring now specifically to Figure 3, it will be seen that the base of the worm gear reduction unit 54 is mounted on a platform 76 by suitable fastening bolts 78. The platform 76 is provided with downturned end portions 80 that are positioned on a supporting frame 82 wherein the supporting frame 82 includes a plurality of radial arms that engages and rests on the upper end of the container 12.

The frame 82 is provided with upstanding dowels 84 having a rounded upper end for engaging apertures in outwardly projecting lugs 86 secured to the supporting base 80 thereby orientating the base 80 on the framework 82 for easy removal of the base 80.

The motor 64 is provided with two pair of depending lugs 88 secured to the base thereof by fastening members 90 and the lugs 88 are provided with apertures slidably mounted on a pair of parallel mounting rods 92 that are secured at their opposite ends to brackets 94. An elongated rod 96 having a screw threaded end 98 engaging a threaded nut secured to the base of the motor 64 is held captive in an aperture on one of the brackets 94 by a pair of stationary sleeves 100. A hand wheel 102 having a hand gripping member 104 is provided for rotating the threaded shaft 96 thereby sliding the motor 64 along the mounting rod 92 thereby adjusting the distance between the pulleys 62 and 58 wherein the rims of the pulleys 62 will be spread apart due to the resilient spring device 66 thereby reducing the speed of the pulley 58 when the motor 64 is moved away from the worm reduction unit 54. This pulley 62 may be of any commercially available type for this purpose. It will be seen that the rod mounting blocks 94 are secured to the rod 92 by set screws 106 and the blocks 94 are secured to the base 80 by fastening bolts 108.

In order to orientate the framework 82 and prevent relative rotation between the framework 82 and the container 12, the upper end of the container 12 is provided with an inwardly struck lug 110 and one of the radial extending arms of the framework 82 is provided with a lug 112 secured to the undersurface thereof with a fastening bolt 114 wherein the lug 112 is positioned under the framework 82 and engages the inwardly struck lug 110 thereby preventing rotation of the framework 82 in relation to the container 12.

A supporting grid generally indicated by the numeral 116 and comprising a plurality of spaced rails 118 joined together by transverse members 120 and a downwardly and inwardly inclined chute 122 on its outer end is provided for supporting a bag of material during the discharge of the bag of material into the container 12. The central rail 118 is provided with an upwardly extending pointed member 124 that engages and penetrates the bag of material for opening the material and the spaced rails 118 will tend to spread the material and break up the material as it is deposited into the container 12. Normally, the material to be positioned in the mortar mixer 10 is received in paper bags wherein the upstanding member 124 will quickly and efficiently slit open the paper bag and permit the discharge of the material therefrom.

In operation, the hub 32 is positioned over the stub shaft 26 with the paddles 70 and 72 positioned in the container 12 in radially and circumferentially spaced relation. The supporting frame 82 is then positioned with the ends of the arms forming the frame 82 engaging the upper end of the container 12 and the lug 112 in engagement with the inwardly struck lug 110 thereby positioning the frame 82 and preventing relative movement between the frame 82 and the container 12. The supporting base 76 with the gear reduction unit 54 and the motor 64 thereon is then positioned on the framework 82 with the dowels 84 positioning and locating the base 76 thereon. The driving hub 46 is now positioned for engaging the projecting pins 42 on the hub 32 thereby rotating the hub 32 and the paddles 70 and 72. By manipulation of a hand wheel 102, the speed of the input shaft 56 to the reduction gear 54 may be varied. It will be understood that the reduction gear 54 reduces the speed from approximately 1725 R. P. M. to approximately 20 to 50 R. P. M. It will be seen that the various elements of the device may be easily taken apart for cleaning, storage or transportation.

The receptacle 12 is generally cylindrical wherein it may be easily rolled or moved to any desired location thereby positioning the mortar mixer adjacent the location of use of the mortar thereby eliminating the usual transportation of the mixed mortar to the place of use.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A mortar mixer comprising an enlarged cylindrical container having an open upper end, a centrally disposed upstanding member in said container, a hub rotatably and detachably mounted on the upper end of said upstanding member, a plurality of radial arms on said hub, depending blades on said arms for agitating material in the container, a drive unit for said hub, a supporting frame for said drive unit, said frame being removably mounted across the upper end of the container, said drive unit having a supporting base detachably supported on said frame, and a separable clutch means interconnecting the drive unit and the central hub for rotating said blades about a central vertical axis.

2. A mortar mixer comprising an enlarged cylindrical container having an open upper end, a centrally disposed upstanding member in said container, a hub rotatably and detachably mounted on the upper end of said upstanding member, a plurality of radial arms on said hub, depending blades on said arms for agitating material in the container, a drive unit for said hub, a supporting frame for said drive unit, said frame being removably mounted across the upper end of the container, said drive unit having a supporting base detachably supported on said frame, and a separable clutch means interconnecting the drive unit and the central hub for rotating said blades about a central vertical axis, said radial arms being of unequal length for movement of the blades in independent paths of movement, each of said blades being disposed in acute angular relation to a tangent of the path of movement for imparting radial and circular movement to the material in the container.

3. A mortar mixer comprising a cylindrical container having an open upper end, an upstanding central member secured to the bottom of said container and terminating at its upper end below the open end of the container, a paddle assembly including a hub rotatably and removably supported on the upper end of said upstanding member, a plurality of horizontal radial arms on said hub, at least one depending paddle on each of said arms, said paddles being arranged to define concentric paths of movement with each paddle having a separate path of movement, said paddles being disposed in angular relation to the tangent line of the path of movement thereof, a frame removably supported on said container, a removable power unit on said frame, and means for separably interconnecting said power source and said hub for driving said paddles and permitting removal of said power unit frame and paddle assembly wherein said frame and container are provided with inter-engaging positioning means for locating the frame on the container and preventing relative movement therebetween and said power unit and frame are provided with inter-engaging means for locating the power unit and aligning the interconnecting means between the power unit and hub.

4. A mortar mixer comprising a cylindrical container having an open upper end, an upstanding central member secured to the bottom of said container and terminating at its upper end below the open end of the container, a paddle assembly including a hub rotatably and removably supported on the upper end of said upstanding member, a plurality of horizontal radial arms on said hub, at least one depending paddle on each of said arms, said paddles being arranged to define concentric paths of movement with each paddle having a separate path of movement, said paddles being disposed in angular relation to the tangent line of the path of movement thereof, a frame removably supported on said container, a removable power unit on said frame, and means for separably interconnecting said power source and said hub for driving said paddles and permitting removal of said power unit frame and paddle assembly, wherein said frame is provided with a supporting grid and an upwardly projecting pointed member thereon for cutting open a sack of material to be placed in the container, said grid supporting the bag and spreading the material as it is deposited in the container.

References Cited in the file of this patent
UNITED STATES PATENTS

| | | |
|---|---|---|
| 903,042 | Barber | Nov. 3, 1908 |
| 1,197,114 | Fay | Sept. 5, 1916 |
| 1,344,836 | Walden | June 29, 1920 |
| 1,708,947 | Jaeger | Apr. 16, 1929 |
| 1,735,143 | Supervielle | Nov. 12, 1929 |
| 2,005,950 | Moroney et al. | June 25, 1935 |
| 2,517,149 | Walsh et al. | Aug. 1, 1950 |
| 2,576,492 | Vogel | Nov. 27, 1951 |